(12) United States Patent
Castex (10) Patent No.: US 12,178,312 B2
(45) Date of Patent: Dec. 31, 2024

(54) MASCARA APPLICATOR

(71) Applicant: CHANEL PARFUMS BEAUTE, Neuilly-sur-Seine (FR)

(72) Inventor: Nicolas Castex, Neuilly-sur-Seine (FR)

(73) Assignee: CHANEL PARFUMS BEAUTE, Neuilly-sur-Seine (FR)

( * ) Notice: Subject to any disclaimer, the term of this patent is extended or adjusted under 35 U.S.C. 154(b) by 359 days.

(21) Appl. No.: 17/767,559

(22) PCT Filed: Oct. 9, 2020

(86) PCT No.: PCT/FR2020/051788
§ 371 (c)(1),
(2) Date: Apr. 8, 2022

(87) PCT Pub. No.: WO2021/069850
PCT Pub. Date: Apr. 15, 2021

(65) Prior Publication Data
US 2023/0022223 A1  Jan. 26, 2023

(30) Foreign Application Priority Data

Oct. 10, 2019 (FR) ........................... 1911256

(51) Int. Cl.
*A45D 40/26* (2006.01)
*A46B 3/00* (2006.01)
(Continued)

(52) U.S. Cl.
CPC ............ *A46B 3/005* (2013.01); *A45D 40/262* (2013.01); *A46B 9/021* (2013.01);
(Continued)

(58) Field of Classification Search
CPC ................ A45D 40/262; A45D 40/265; A45D 2200/10; A46B 3/005; A46B 2200/106; A46B 9/021
See application file for complete search history.

(56) References Cited

U.S. PATENT DOCUMENTS

| 5,094,254 A | 3/1992 | Krueckel et al. |
| 7,677,826 B2 | 3/2010 | Gueret |

(Continued)

FOREIGN PATENT DOCUMENTS

| DE | 202017100134 U1 | 5/2018 |
| EP | 1 623 650 A2 | 2/2006 |

(Continued)

OTHER PUBLICATIONS

International Search Report issued in International Patent Application No. PCT/FR2020/051788, dated Jan. 12, 2021, along with an English language translation thereof.

(Continued)

*Primary Examiner* — Rachel R Steitz
(74) *Attorney, Agent, or Firm* — GREENBLUM & BERNSTEIN, P.L.C.

(57) ABSTRACT

An applicator for mascara having an oblong general shape extending along a main axis, the applicator including at least three branches distributed around the main axis so as to define a cavity between them inside the applicator. The branches extend between a base to which they are connected and a free end of the applicator, which is remote from the base, and are shaped such that the cavity has a form of a surface of revolution around the main axis, said cavity being open by spaces formed between said branches. The branches extend in helical form around the main axis. The invention so developed makes it possible to obtain an applicator for mascara providing high autonomy by virtue of an internal cavity, the general three-dimensional configuration of which (Continued)

provides a good level of flexibility and enables easy application to the eyelashes.

12 Claims, 4 Drawing Sheets

(51) Int. Cl.
  *A46B 9/02* (2006.01)
  *B33Y 10/00* (2015.01)
  *B33Y 80/00* (2015.01)
(52) U.S. Cl.
  CPC .... *A45D 2200/10* (2013.01); *A46B 2200/106* (2013.01); *B33Y 10/00* (2014.12); *B33Y 80/00* (2014.12)

(56) References Cited

U.S. PATENT DOCUMENTS

| 2008/0219748 | A1 | 9/2008 | Salciarini |
| 2008/0245382 | A1* | 10/2008 | Marciniak-Davoult ..................... A46B 7/04 401/121 |
| 2013/0319451 | A1 | 12/2013 | Viegas |
| 2017/0020266 | A1* | 1/2017 | Sanchez ................. A46B 9/005 |
| 2019/0307236 | A1 | 10/2019 | De Bardonneche |

FOREIGN PATENT DOCUMENTS

| EP | 2 120 631 A2 | 11/2009 |
| JP | 3030383 B2 | 4/2000 |
| JP | 2008-018245 A | 1/2008 |
| JP | 2014-087642 A | 5/2014 |
| WO | 2008/113939 A2 | 9/2008 |
| WO | 2017/212123 A1 | 12/2017 |
| WO | 2018/115770 A1 | 6/2018 |

OTHER PUBLICATIONS

Written Opinion of the International Searching Authority issued in International Patent Application No. PCT/FR2020/051788, dated Jan. 12, 2021.

Office action of Japanese corresponding Application No. 2022-521326, citing new references, mailing date May 9, 2023, along with English language translation.

* cited by examiner

MASCARA APPLICATOR

BACKGROUND

1. Field of the Invention

The present invention concerns the field of cosmetic product applicators, and in particular mascara applicators.

2. Description of the Background

An item of mascara, or "mascara", conventionally comprises a case, a mascara reservoir and an applicator brush. The applicator brush comprises a part for gripping and an applicator proper, which generally takes the form of a brush. The applicator brush may, in known manner, comprise a cap or lid configured to close off the reservoir when not applying mascara and which is able to form the gripping area of the applicator brush.

Conventionally, several types of applicator exist, those of "bottle brush" type, those that are injection molded and those produced by additive manufacturing (sometimes called "additive manufacture"). Additive manufacturing designates the processes of manufacture by addition or aggregation of material.

An applicator of bottle brush type comprises a brush which has bristles formed by fibers trapped in a twisted metal wire forming the core of the applicator.

An injection-molded applicator is generally formed of one piece and comprises bristles or teeth of plastic material for example, generally called protrusions.

An applicator manufactured by additive manufacturing is generally in one piece too and may be formed for example from a powder of thermoplastic polymers via a process implementing for example powder melting by laser.

Whatever the form and the embodiment of a known mascara applicator, the principle of application of mascara consists of loading the applicator with product (mascara) contained in the reservoir, of extracting the applicator from said reservoir, the protrusions of the applicator being laden with product, and performing the application on the user's eyelashes and eyebrows.

In the interest of simplicity, reference is made only to eyelashes below in the present document, without however excluding use of the product and of the applicator to the user's eyebrows.

One of the known drawbacks of mascara applicators is that the product load it can carry in its protrusions is relatively small, which potentially obliges the user to reload it several times in the course of a same application. Furthermore, too great an applicator load must be avoided since that is not suitable for a fine and regular application of the mascara. Thus, the reservoir of the mascara article comprises, in the vicinity of its mouth, a wiping device or "wiper" through which the applicator passes when it comes out of the reservoir such that the applicator carries within its protrusions, after removal from the reservoir, the desired product load, sufficient but not excessive, evenly distributed over the surface and/or within the protrusions of the applicator. To refill the applicator, the user must re-insert it into the reservoir, and take it out again. This operation is not very practical, and in itself the application of the mascara is furthermore made more complex when carried out in several stages.

Document EP 1 623 650 discloses an applicator for a cosmetic product which provides a solution to this problem by proposing an application member comprising an inside cavity able to form a store of cosmetic product. Nevertheless, the configuration of the applicator proposed in that document proves to be imperfect, or possibly even inappropriate for the application of mascara. More particularly, the applicator proposed, and especially the application member formed between two branches that are flocked or bear a coating which may for example be textile is primarily configured for the application of a product to the skin or lips. When used to apply mascara, it is not optimum as regards the quality of application of the product, for example concerning the capacity to separate and elongate the user's eyelashes, and to enable even application of the product. The general form of this applicator is furthermore not optimal.

SUMMARY

The invention is directed to providing an applicator device for mascara providing greater ease of use, and in particular a good level of autonomy during application, while ensuring a high quality of application to the user's eyelashes.

Thus, the invention relates to an applicator for mascara having an oblong general shape and extending along a main axis, the applicator comprising at least three branches distributed around the main axis so as to define a cavity between them inside the applicator. The branches of the applicator extend between a base to which they are connected and a free end of the applicator, which is remote from the base, and are shaped such that the cavity has a form of a surface of revolution around the main axis, said cavity being open by spaces formed between said branches.

The three or more branches of the applicator make it possible to define a cavity of revolution enabling a certain quantity of product to be retained which is able to reload the outside surface of the applicator when mascara is applied to the user's eyelashes.

The branches extend around a central axis and the oblong conformation of the applicator gives it a degree of flexibility, even when it is constituted by a relatively rigid material. This flexibility advantageously makes it possible to facilitate taking out the applicator and optimizing its wiping avoiding in particular the irregular accumulation of product on the protrusions.

The branches may meet in the vicinity of the free end of the applicator, where they are connected together.

The applicator may in particular comprise five branches.

Five branches make it possible to properly define the internal cavity of revolution, while providing spaces or interstices between the branches for the passage of the product. A geometry with five branches furthermore remains relatively simple.

The branches may each comprise, on an outside surface, protrusions extending perpendicularly and radially in relation to the main axis.

The protrusions may have a length varying along the main axis, the length of the protrusions continuously increasing between the base and a point of the main axis located between said base and the free end of the applicator, and continuously decreasing between said point of the main axis and the free end of the applicator. Each protrusion of the applicator may in particular have a length comprised between 0.2 mm and 2.5 mm.

On each branch, the protrusions may be aligned in two rows or in three rows between the base and the free end.

The disposition of the protrusions of the applicator provided enables the applicator to bear a satisfactory load of product, but also to give effective brushing and separation of the eyelashes.

The protrusions of two adjacent rows may be disposed in a staggered arrangement. The branches may advantageously extend in helical form around the main axis. In such an arrangement in helical form, each branch may turn, from the base to the free end of the applicator and around the main axis, through an angle comprised between 45° and 90°, preferably comprised between 55° and 75°.

Branches extending in helical form make it possible to go with the natural movement of the user on application of the mascara, and improves the separation of the eyelashes.

The mascara applicator may be formed from a thermoplastic polymer selected from:
polyamide.
polyacrylamide, and
polyetherketoneketone.

The applicator may be formed by additive manufacturing by thermoplastic polymer powder bed fusion.

An additive manufacturing method enables the three-dimensional geometry of the applicator to be obtained. Relatively rigid materials, easy to implement in the context of an additive manufacturing method and enabling a high level of production finesse, may be employed since the geometry of the applicator enables it to be conferred with the desired flexibility.

Still other particularities and advantages of the invention will appear in the following description.

BRIEF DESCRIPTION OF THE DRAWING

In the accompanying drawings, given by way of non-limiting example.

DETAILED DESCRIPTION

Figure 1:
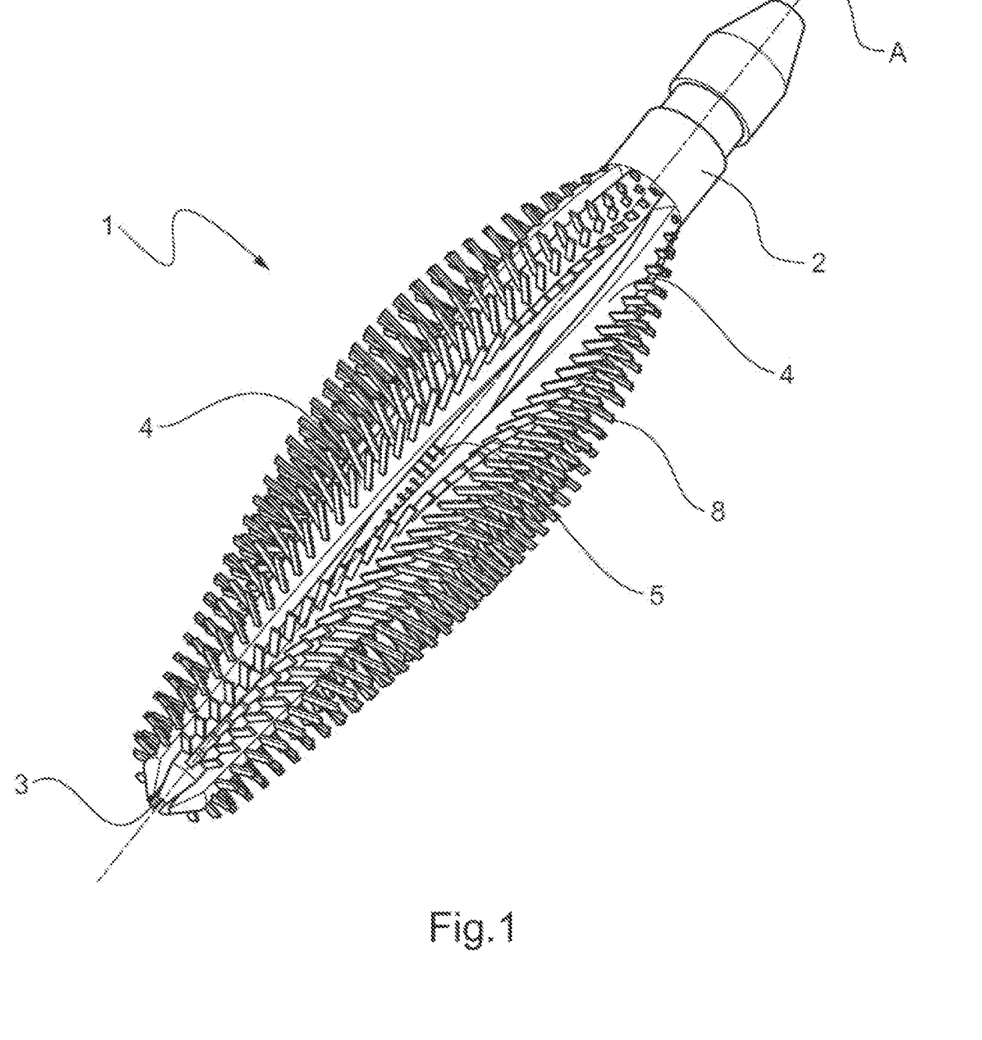
FIG. 1 shows, in a three-dimensional view, a mascara applicator in accordance with one embodiment of the invention.

FIG. 1 shows, in a three-dimensional view, a mascara applicator in accordance with one embodiment of the invention. The applicator 1 has an oblong general shape and extends along a main axis A. In particular, the applicator comprises a base 2 at one of its ends, and extends along the axis A to reach a free end 3.

An applicator in accordance with the invention comprises several branches 4 which extend between the base 2 and the free end 3. In particular, the applicator comprises at least three branches. The applicator can in particular comprise three, four, five or six branches. Each branch can have, between the base 2 and the free end 3, an invariable or substantially invariable cross-section, or more advantageously, a cross-section the dimensions of which change according to the distance from the branch to the main axis.

Each branch 4 is connected to the base 2. In particular, in the context of a one-piece formation of the applicator 1, each branch 4 comes out of the base 2.

The branches 4 form a cavity 5 between them, which is internal to the applicator 1. The cavity 5 has the shape of a surface of revolution around the main axis A. In other words, at every point of the main axis A between the base 2 and the free end 3, each branch 4 is at equal distance from said main axis A.

In the example represented here, each branch 4, leaving the base 2 and going towards the free end 3, progressively diverges from the main axis A before coming closer and closer in the vicinity of the free end 3, preferably in immediate proximity to the latter in order to maximize the length of the cavity 5. In particular, the more the cavity 5 extends over a large proportion of the length of the applicator, the more the latter is capable of reloading with product over a large portion of its length, on application of the product. The presence of the cavity 5 and the geometry of the branches 4 furthermore give a degree of transverse flexibility to the applicator 1, according to the cross-section, the length, the shape and the material constituting the branches 4.

Figure 2:
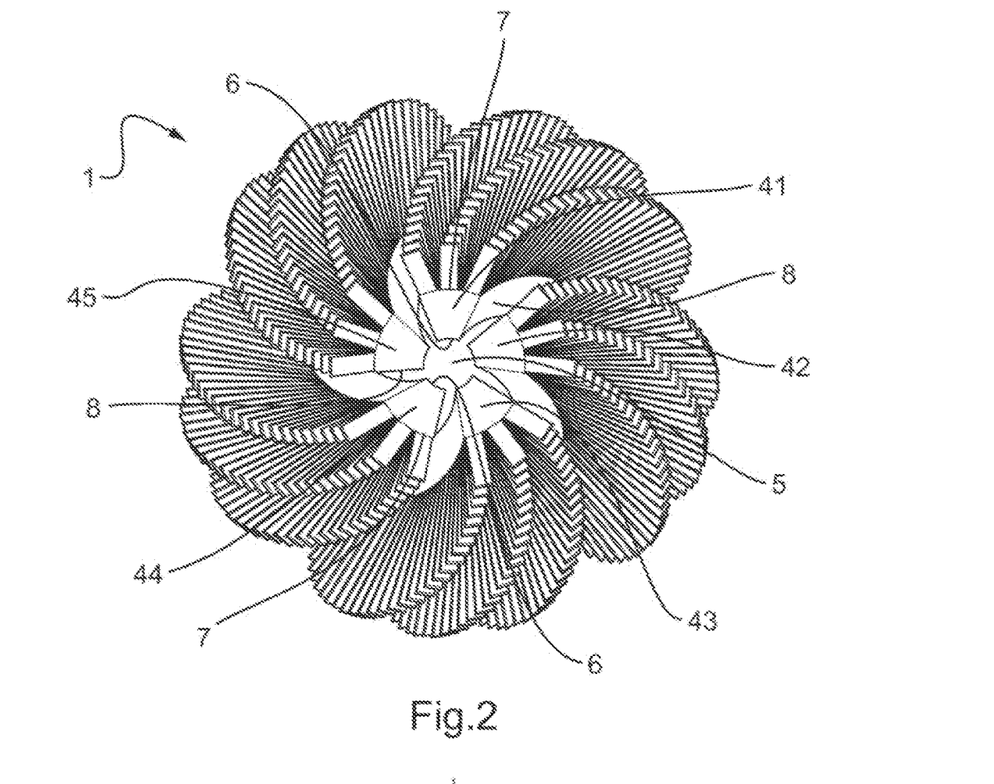
FIG. 2 is a three-dimensional representation of the applicator of FIG. 1 viewed from above.

As illustrated in the present embodiment, and visible in FIG. 2, the applicator may for example comprise five branches 4, i.e. a first branch 41, a second branch 42, a third branch 43, a fourth branch 44 and a fifth branch 45. The implementation of five branches would appear to be a particularly advantageous compromise making it possible to properly define the outside shape desired for the applicator as well as the shape desired for the cavity 5, while leaving spaces between the branches 4 enabling the cavity to be filled with product as well as to properly and evenly reload the outside surface of the applicator with product. An applicator comprising at least three branches, and in particular five branches or more also makes it possible to improve the ease of application of a product with said applicator. Such a configuration indeed makes it possible to have at least one branch contact with the fringe of the eyelashes whatever the orientation of the applicator and the hand movement of the user, whether or not the user makes a rotating movement of the applicator on making contact with said fringe of the eyelashes.

The cavity 5 is thus defined within inside surfaces 6 of the branches 4. The inside surface 6 of each branch may have a concave shape, in the form of a circle arc. The inside surface 6 of each branch 4 thus perfectly matches a portion of surface inside face of the cavity of revolution 5 which said branches 4 conjointly define.

The cross-section for each branch 4 may be defined, as illustrated in FIG. 2, between an inside surface 6 and an outside surface 7 in the form of concentric circle arcs, centered on the main axis A, the straight lateral edges 8 of said cross-sections extending radially from the main axis A.

Each branch 4 may extend in a plane comprising the main axis, but, according to preferred embodiments of the invention, the branches extend in helical form around the main axis A. Thus, each branch 4 extends spiraling around the main axis 1. The pitch of the helix formed by the branch 4 around the main axis A may be constant, or may be variable between the base 2 and the point at which the branches 4 join in the vicinity of the free end 3. The pitch of each branch is identical, such that each branch 4 of the applicator 1 extends parallel to the two branches located on opposite sides of it.

Over the length of the applicator, between the base 2 and the free end 3, the helix formed by each branch may be specified by the angle it forms around the main axis A (angle between the end of the branch at the base 2 and the end of the branch at the free end 3 or from the point where the branches meet towards the free end 3). For example, each branch may form an angle comprised between 0° (constituting a straight branch) and 360° (branch forming a full turn between the base 2 and the free end 3), or even more. In particular, each branch may, over the length of the applicator, form an angle comprised between 45° and 90°.

Figure 3:
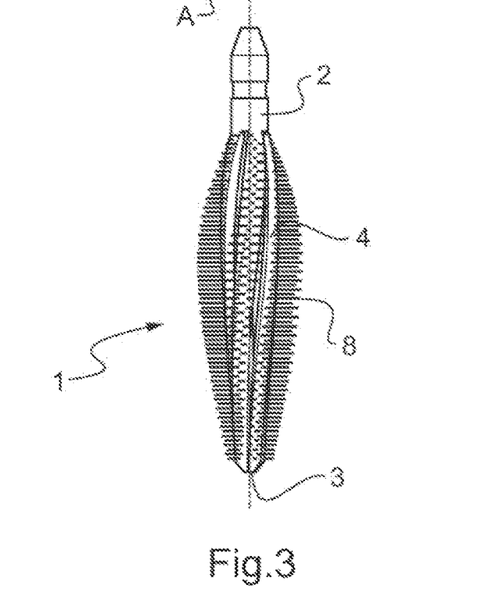
FIG. 3 is a three-dimensional representation of the applicator of FIGS. 1 and 2 viewed from the side.

FIGS. 1 to 3 in particular present an embodiment of an applicator in accordance with the invention in which each branch forms a helix turning through 65° between the base 2 and the free end 3. Such an embodiment, by virtue of the arrangement of the branches in helical form, is particularly advantageous for going with the user's application hand movement and for increasing the occurrence of contact between a protrusion laden with product (for example mascara) and an eyelash.

Each branch 4 bears on its outside surface 7 one or more series of protrusions. By protrusion is meant any elongate member for small cross-section configured to bear, on itself or between itself and one or more neighboring protrusions, a load of product, in particular mascara. A protrusion may thus have, without departing from the scope of the present invention, various constitutions, forms, and properties in particular with regard to its flexibility, its roughness, etc.

As the applicator of the invention is especially configured for one-piece formation from a plastics material, for example in particular by an additive manufacturing process, each protrusion 8 may in particular be formed from the same plastics material as the rest of the applicator.

Each protrusion 8 may have a cylindrical or prismatic shape (with a base that is substantially square, rectangular, or of any other regular or irregular polygonal shape). The dimensions of the base of such a cylinder or prism are advantageously small compared with the height of the cylinder or prism which corresponds to the length of the protrusion considered. For example, substantially prismatic protrusions of a 0.2 mm square cross-section may be employed with success. Of course, the cross-section and the material employed to form a protrusion 8 directly influence its stiffness. A square cross-section of 0.2 mm can in particular be employed for a brush formed from polyamide 11 or from a material with mechanical properties that are close.

The protrusions 8 of the applicator 1 have two main functions, i.e. a function of retaining a certain quantity of product to be applied to the user's eyelashes, and a function of brushing the eyelashes. By brushing the eyelashes, an effect is sought of separation between the eyelashes, extension, or even of curving them.

Preferably, the protrusions 8 of the applicator 1 extend perpendicularly to the main axis A As a matter of fact, on applying mascara, the user positions the applicator substantially perpendicular to her eyelashes, and performs a brushing movement by translation of the applicator perpendicularly to the main axis A, and/or a movement of rotating the applicator around the main axis A. The protrusions 8 of the applicator 1 extend perpendicularly to the main axis A thus making it possible to brush and efficiently separate the user's eyelashes.

A direction of radial extension of the protrusions in relation to the main axis A is especially favorable to the brushing function of the applicator. Furthermore, the fact that each branch extends in helical form also promotes this brushing function, since on application the protrusions carried by a given branch progressively come into contact with and between the user's eyelashes. In other words, the branches in helical form go with the user's usual hand movement and increase the occurrence of contact between a protrusion laden with product and an eyelash of the user.

The protrusions 8 are regularly distributed along each branch 4. Each branch 4 may in particular for example bear one, two, or three rows of protrusions. A row of protrusions 8 constitutes a line of protrusions 8 on the outside surface 7 of a branch, from the base 2 to the free end 3. The line follows the general configuration of the branch (straight line for a straight branch 4, line in helical form as in the example shown for a branch 4 in helical form).

In the example shown here, each branch bears three rows of protrusions. The rows of protrusions may for example be spaced on average by 0.3 mm. Furthermore, each protrusion 8 of one row is equidistant from the adjacent protrusions of the same row. The protrusions of a same row may for example be at a distance of 0.2 mm. The protrusions of two adjacent lines of a same branch (when more than one line is present) are furthermore advantageously disposed in staggered arrangement, in the direction defined by the main axis A. This ensures better distribution of the protrusions at the surface of the applicator, and improves both the retention of the product and the brushing of the eyelashes.

The length of the protrusions may be variable along the main axis A. In particular, short protrusions primarily have a role in product retention, while longer protrusions primarily have a role of separation and/or combing of the eyelashes. In particular, the length of the protrusions may, starting from the base 2 and going to the free end 3, increase between the base and a point of the main axis located between said base and the end of the applicator, then decrease between said point of the main axis and the end of the applicator.

The length of the protrusions 8 employed may thus vary, by way of example, between 0.2 mm and 2.5 mm.

This variation in length advantageously makes it possible to define an oblong and regular overall shape of the applicator. For example, the applicator may in cross-section have a substantially elliptical outside shape.

In the embodiment example shown approximately one third of the protrusions, the shorter ones, located in the vicinity of the base 2 and of the free end 3, principally serve for product retention, while the two thirds located towards the center of the applicator 1 serve both for product retention and effective separation of the eyelashes.

Figure 4:
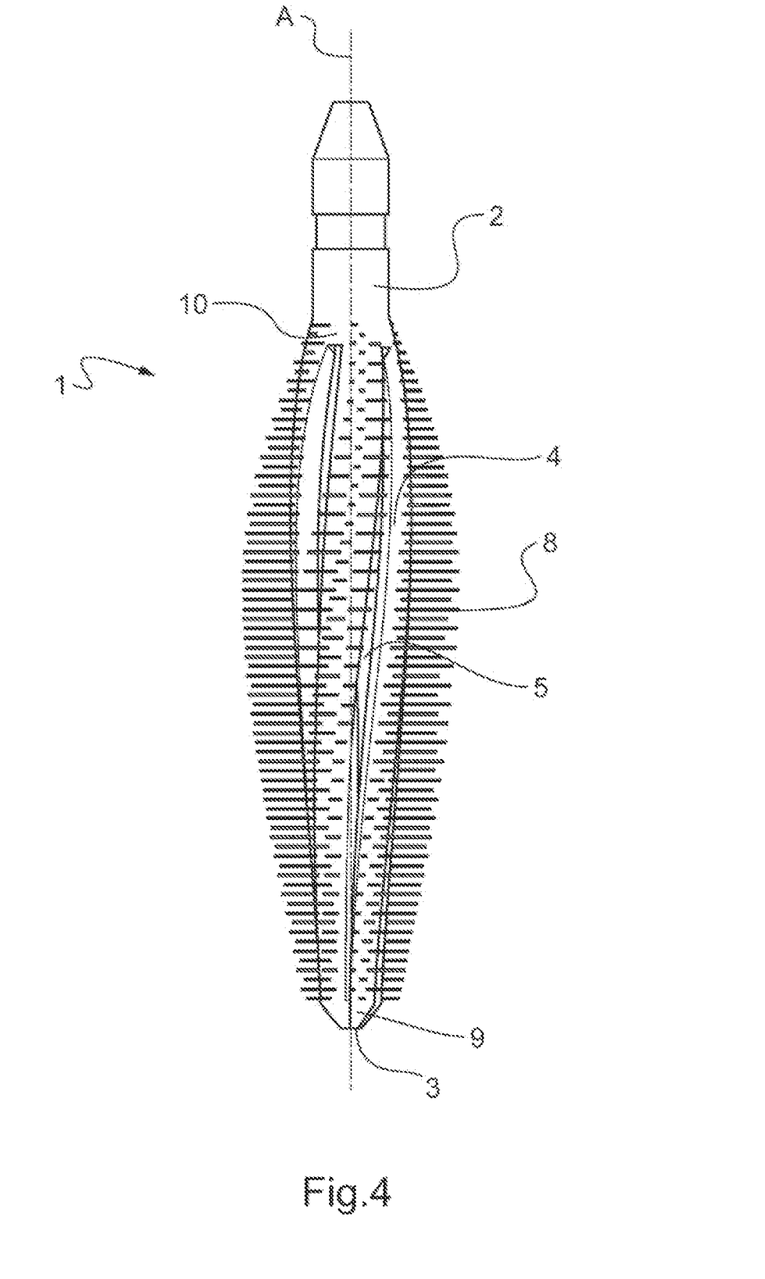
FIG. 4 is a three-dimensional representation from the side similar to that of FIG. 3, of an applicator according to an alternative embodiment of the invention.

The branches may be connected together at the free end 3, as illustrated in FIG. 4, and form a tip 9. In the example of FIG. 4, the branches are also connected slightly beyond the base 2, by an integrally formed member 10 located between said branches 4. One or other of these features may be present independently of the other according to embodiments of the invention, or in combination as in the embodiment of FIG. 4.

Apart from the fact that the branches 4 meet in the vicinity of the free end 3 and are connected together at that free end so as to form a single tip 9, and the presence of the integrally formed member 10, the embodiment of FIG. 4 is identical to that illustrated in FIGS. 1 to 3. The description made with reference to FIGS. 1 to 3 thus applies in general terms to the embodiment of FIG. 4.

In the example embodiment shown in FIG. 4, the integrally formed member 10 and the tip 9 extend over approximately 20% of the length of the applicator (along the main axis A, between the base 2 and the free end 3), such that the cavity 5 extends over approximately 80% of the length of the applicator.

Figure 5:
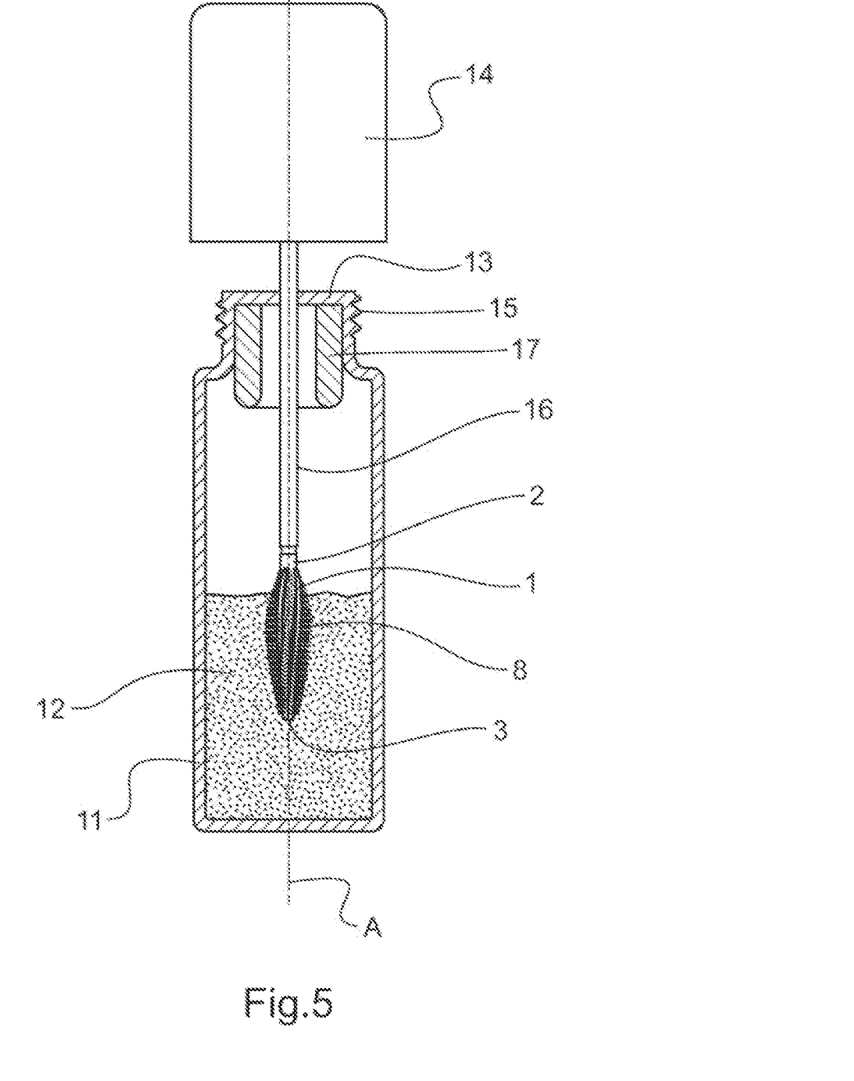
FIG. 5 is a partial transverse cross-section representation of a mascara article comprising an applicator in accordance with an embodiment of the invention.

FIG. 5 represents, by way of example, a mascara item which implements an applicator in accordance with an embodiment of the present invention.

The mascara item comprises a reservoir 11 containing a cosmetic product 12 configured to be applied to the eyelashes. The reservoir comprises a mouth 13, able to be closed by a lid 14. For example, the mouth 13 may be formed by a threaded neck 15 on which may be screwed the lid 14 which itself comprises corresponding screw threading. In FIG. 5, for facilitated viewing, the reservoir 11 is shown in cross-section, while the applicator 1 and the lid 14 are shown in side view.

In the example shown here, the lid 14 also forms the gripping zone enabling the applicator to be manipulated. In particular, a rigid shank 16 connects the lid 14 to the applicator 1, coaxially with the main axis A of the applicator 1. The shank may be butt-joined at one of its ends to the base 2 of the applicator, and rigidly fastened to the lid 14 at its other end. Alternatively, the shank 16 may be formed as one piece with the applicator.

The reservoir 11 of the mascara item is equipped, in the vicinity of its mouth (for example wholly or partly in the threaded neck 15), with a wiping device 17 or "wiper".

The wiping device 17 forms a restriction at the mouth of the mascara item, which transversely (perpendicularly to the main axis A) constrains the applicator 1 at the time of its passage within said wiping device 17.

The wiping device is formed from a flexible member, making it possible to provide uniformity for the cosmetic product loaded on the applicator 1. On passage through the wiper, the branches 4 of the wiper are deformed towards the main axis A, which sets the amount of cosmetic product contained in the cavity 5 of the applicator. The configuration of the applicator that gives it a degree of transverse flexibility also enables use of a smaller wiper 17 than in the mascara items known in the prior art. Thus, on passing by the wiper, the applicator 1 is constrained towards the main axis 1, it bends, its protrusions are wiped, it disgorges a quantity of product present in excess in the cavity 5. The applicator 1 resumes its initial form, and in particular its overall diameter, once extracted from the reservoir 11 and removed from the wiping device 17. The residual product in the cavity 5 enables the autonomy of the applicator to be increased and to limit or even eliminate operations of reloading the applicator during an application.

An applicator 1 in accordance with the invention, on account of its geometry, may advantageously be manufactured by an additive manufacturing process.

Document EP2120631 discloses in general terms a method for obtaining a cosmetic applicator by additive manufacturing. Such a method may be implemented for obtaining an applicator in accordance with an embodiment of the invention. A method of powder bed fusion may in particular be employed.

In particular, a powder of a thermoplastic material may be employed. In particular, a powder of polyamide (in particular polyamide 11 or polyamide 12), of polyetherketoneketone or of polyacrylamide may be employed.

Additive manufacturing proves to be particularly suitable for obtaining the applicator 1, in particular on account of its complex three-dimensional geometry comprising an internal cavity. Polyamide 11 or a similar thermoplastic material is very well suited to additive manufacturing methods, in particular to sintering methods. This material is however rigid, and reputed therefore not very suitable for forming a mascara brush. However, the applicator configuration provided, having an internal cavity, enables a certain transverse flexibility to be obtained. The synergy between the plastics materials envisioned and the geometry giving a certain flexibility to the central part of the applicator thus enables optimal mechanical properties to be obtained for a mascara applicator. The configuration provided in the invention in particular gives flexibility to the applicator yielding advantages to optimize its wiping, to take the applicator out of its container, and to make the application onto the eyelashes more gentle.

The invention so developed makes it possible to obtain an applicator for mascara providing high autonomy by virtue of an internal cavity. The applicator provided has a general three-dimensional configuration of a surface of revolution enabling easy application onto the eyelashes. According to various embodiments, the quality of brushing and of separation of the eyelashes is furthermore optimized.

The applicator provided in the invention is particularly configured to be obtained by additive manufacturing and especially by a process of laser fusion of polymer powder, or SLS, acronym for Selective Laser Sintering, the synergy between the material employed and the geometry of the applicator enabling optimal mechanical properties to be obtained for the applicator.

The invention claimed is:

1. Applicator for mascara having an oblong general shape and extending along a main axis, the applicator comprising:
at least three branches distributed around the main axis so as to define a cavity between them inside the applicator, wherein:
the branches extend between a base to which they are connected and a free end of the applicator, remote from the base, and are shaped such that the cavity has a form of a surface of revolution around the main axis, said cavity being open by spaces formed between said branches, and said branches extend in helical form around the main axis;
the cavity is free of any element connecting the base and the free end of the applicator; and
each branch, leaving the base and going towards the free end, progressively diverges from the main axis before coming closer and closer in the vicinity of the free end.

2. Applicator for mascara according to claim 1, wherein: the branches meet in the vicinity of the free end where they are connected together.

3. Applicator for mascara according to claim 1, wherein: the branches are five in number.

4. Applicator for mascara according to claim 1, wherein: the branches each comprise, on an outside surface, protrusions extending perpendicularly and radially in relation to the main axis.

5. Applicator for mascara according to claim 4, wherein: the protrusions have a length varying along the main axis, the length of the protrusions continuously increasing between the base and a point of the main axis located between said base and the free end of the applicator, and continuously decreasing between said point of the main axis and the free end of the applicator.

6. Applicator for mascara according to claim 4, wherein: each protrusion of the applicator has a length comprised between 0.2 mm and 2.5 mm.

7. Applicator for mascara according to claim 4, wherein: on each branch, the protrusions are aligned in two rows or in three rows between the base and the free end.

8. Applicator for mascara according to claim 7, wherein: the protrusions of two adjacent rows are disposed in staggered arrangement.

9. Applicator for mascara according to claim 1, wherein:
each branch turns, from the base to the free end of the applicator and around the main axis, through an angle comprised between 45° and 90°.

10. Applicator for mascara according to claim 1, formed from a thermoplastic polymer selected from:
polyamide,
polyacrylamide, and
polyetherketoneketone.

11. Applicator for mascara according to claim 1 formed by additive manufacturing by thermoplastic polymer powder bed fusion.

12. Applicator for mascara according to claim 1, wherein:
each branch turns, from the base to the free end of the applicator and around the main axis, through an angle comprised between 55° and 75°.

* * * * *